Nov. 16, 1971   J. A. HAYS   3,619,867
SEED COTTON ROLL BOXES FOR COTTON GIN STANDS
Filed March 23, 1970   2 Sheets-Sheet 1

INVENTOR
JOHN A. HAYS
BY
ATTORNEY

Nov. 16, 1971 J. A. HAYS 3,619,867
SEED COTTON ROLL BOXES FOR COTTON GIN STANDS
Filed March 23, 1970 2 Sheets-Sheet 2

INVENTOR
JOHN A. HAYS
BY
ATTORNEY though the seed cotton roll have accentuated demands on seed cotton roll box construction. Structures are known to the prior art which incorporate toothed or fingered rollers rotating internally of the seed cotton roll with a view to oscillating the roll across the ribs and saw teeth. In the view of your inventor, these devices known to the prior art have some objectionable features which prompted your inventor to conceive of and perfect this invention.

The improvement of this invention may be incorporated in various types of gin stands presently in manufacture and use. It is capable of being incorporated in gin stand utilizing any number of ginning saws. It may also be incorporated in the seed cotton roll box of a gin stand utilizing either a brush or air blast method for delinting the ginning saw. In brief, this invention incorporates laterally displaced vanes projecting from the scroll sheet of the seed cotton roll box into the area of the rotating roll of seed cotton. In the preferred embodiment, the vanes were constructed of stainless steel welded or integral with the front scroll sheet. The preferred embodiment utilized vanes on six inch centers uniformly spaced starting on each end of the roll box. If we assume the vane to start at a zero point at the top of a scroll sheet they deflect ⅝ of an inch as they move toward the center section of the scroll sheet then reverse their direction as they move toward the other edge of the scroll sheet returning to the zero point. In the preferred embodiment, the vanes were constructed to project approximately two inches into the seed cotton roll. In the overall construction of the scroll sheet, the design incorporated left-hand vanes and right-hand vanes. The V shape or chevron like vanes are constructed uniformly in the scroll sheet with the apex or center point of the vanes projecting or pointing toward the center of the scroll sheet. The above arrangement of the vanes results in a neutral or null section in the exact center section of the scroll sheet. As the feed rollers or fingers lift or kick the seed cotton into the ginning saws which lifted the cotton into the roll box against the ginning ribs, a seed cotton roll forms in the roll box and has a direction of rotation opposite to that of the ginning saws. In the normal construction of a roll box, two scroll sheets are utilized. The first of these adjacent the point in which the cotton is fed into the roll box will be referred to as a front scroll sheet. The opposite scroll sheet is referred to as the back scroll sheet. The vanes of this invention may be incorporated in either or both the scroll sheets; however, in the preferred embodiment, it was found that it was satisfactory to incorporate the vanes in the front scroll sheet only. As a normal ginning action rotates the seed cotton roll, the construction of these vanes cause the roll to shift laterally and work or move across the face of the saw teeth exposing fresh seed cotton to the ginning saws as well as brush the cotton roll across the ginning ribs reducing characteristic spindle twist.

One object of this invention was to design a roll box of relative economical cost of construction and adaptable to existing gins which would improve the rate of production of the gin and the quality of the lint.

Another object was to construct a device which would oscillate the seed cotton roll utilizing no additional moving parts.

Other objects and advantages will become apparent to those skilled in the art from a study of the following views and attached detailed description.

Reference is now made to the attached several views wherein like reference characters refer to identical or equivalent components throughout the several views and the following detailed description.

FIG. 3 is a front elevation view of scroll sheet disclosing the V-shaped or chevron-like vanes.

Figure 1:
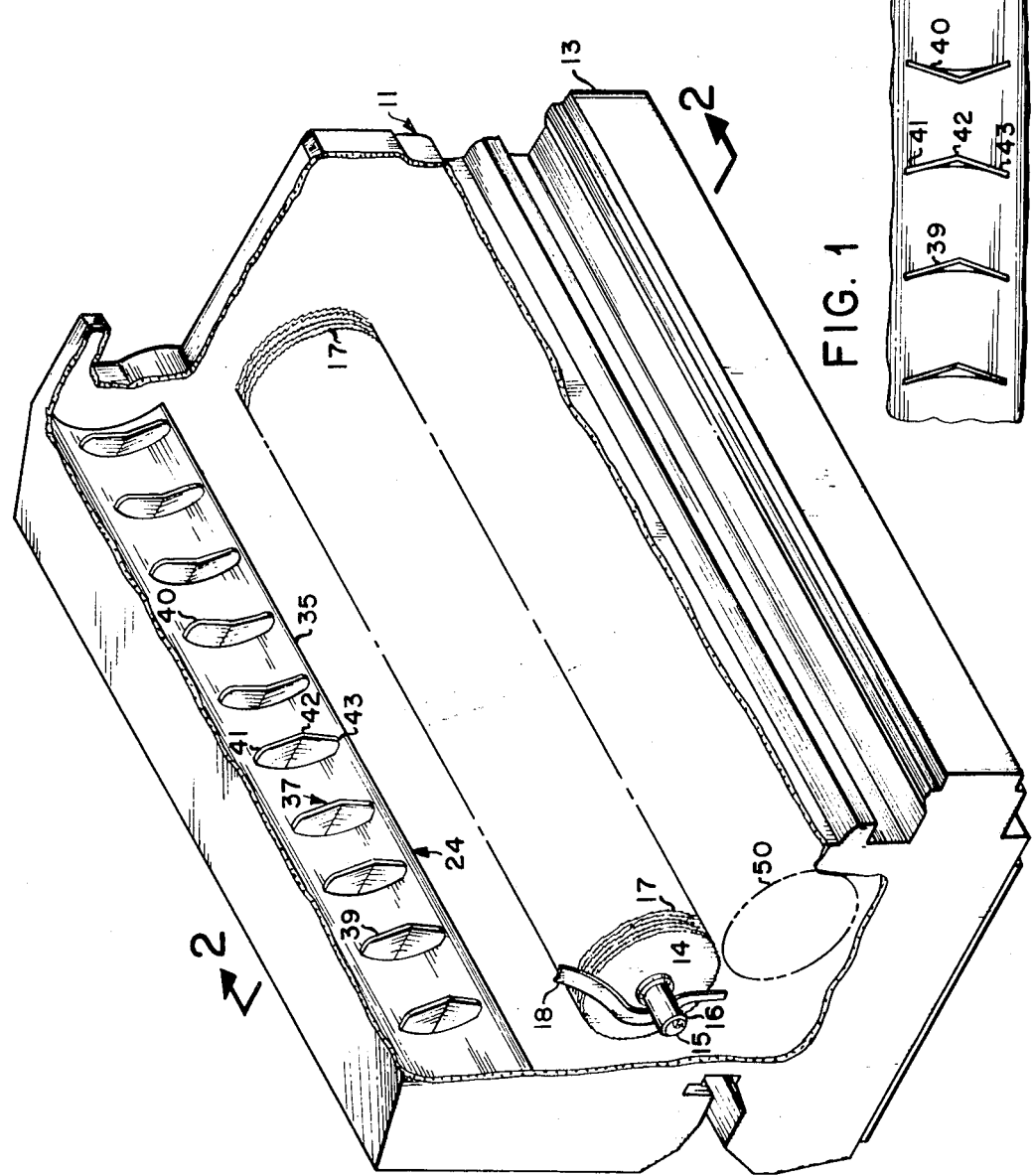
FIG. 1 is a rear elevation view of the gin stand partially in sections disclosing a portion of the front scroll sheet.
Figure 2:
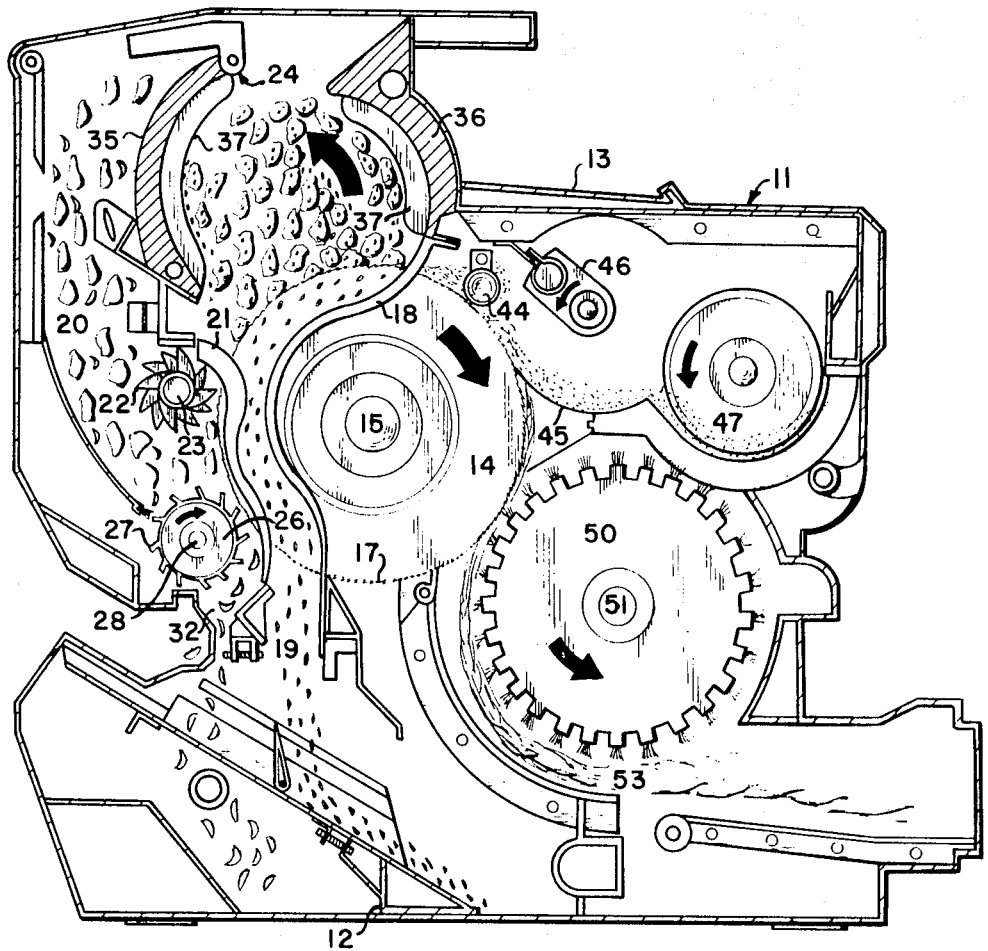
FIG. 2 is a sectional view of FIG. 1 taken substantially on line 2—2 of FIG. 1 looking in the direction of the arrows.

The device of this invention may be incorporated in any well known type of gin stands now in use, for the purpose of this description reference is made to FIG. 1 and FIG. 2, illustrating a saw type gin utilizing a delinting brush. The gin stand 11 may be constructed on a frame 12 which is normally encased by housing 13. Ginning saws 14 are mounted on the saw shaft 15 which is mounted for rotation on saw shaft bearing means 16. Saw shaft may be rotated by a variety of shaft driving means not shown. In the ginning process, a saw teeth 17 pulled the lint cotton through the space in the ginning ribs 18. The delinted seed drops through seed channel 19 while the lint cotton proceeds through the gin stand 11.

For an illustration of the construction and operation of the device in a type of gin reference is particularly made to FIG. 2. The unginned seed cotton intermixed with some trash is fed through feed chute 20. The cotton proceeds down this channel to a point adjacent to feed ribs 21. The kick roller or feed fingers 22 are mounted on feed shaft 23 which is mounted for rotation and driven in such a manner as to pick up the seed cotton and kick or lift it into the saw teeth 17 and feed ribs 21. The seed cotton moves into the roll box 24 while the bolls and trash mixed with the unginned cotton drops on the trash roller 26 and is caught in the trash vanes 27. This trash roller is secured to a trash roller shaft 28 which is mounted in bearing means not shown and driven for rotation by suitable drive means. Trash falls down into trash channel 32 and is removed by a conveyor not shown.

It must be recognized that while this invention fits into the overall construction of a gin stand it relates primarily to an improvement in the construction and mode of operation roll box 24. For the details of the roll box 24 construction, reference is particularly made to FIG. 2 and FIG. 3. The invention might utilize a roll box cover member incorporating rollers not shown. Roll box front scroll sheet 35 is mounted adjacent feed chute 20 and kick roller or feed fingers 22, opposite the front scroll sheet 35 is rear scroll sheet 36. The vanes 37 which constitute the gravement of this invention are attached to or constructed integral with the front scroll sheet 35 and may be incorporated in a rear scroll sheet 36. The roll box is constructed with a left end and a right end creating a somewhat enclosed cylindrical structure. The ends are not specifically illustrated in the views but may be constructed as a component of the housing 13 of the gin stand 11.

For a detailed description of the vanes 37 and their incorporation in the scroll sheet 36 and 36, reference is made to FIG. 3. The vanes comprise left scroll sheet vanes 39 and right scroll sheet vanes 40. Each series preferably originates approximately four inches from each end of the scroll sheet 35 and 36. As previously stated, they are secured to or integral with the scroll sheet 35 and 36 to create a smooth surface which will not unduly impede the rotation of the seed cotton roll. For a detailed description of the construction of the vanes 37 on the scroll sheets 35 or 36 reference is first made to FIG. 3. In the preferred embodiment the left hand vane 37 would originate at a zero point 41 the V shape or chevron like vanes 37 are constructed with an angular deflection projecting toward the center of the scroll sheet 35 or 36. This inward deflection terminates at the point of maximum deflection at 42. In the preferred embodiment, the lateral offset from the zero point 41 to the center point 42 was ⅝ of an inch. The lower portion of the vane 37 is constructed at an angle from the center point 42 to return to the zero point at 43. In the preferred mode of construction the vanes 37 comprise two compatible straight sections as illustrated in FIG. 3. A similar functional construction is suggested in the FIG. 4. The origin or zero point is at 41; the point at maximum deflection of ⅝ of an inch is illustrated at center point 42 and the lower portion returns to zero deflection at 43. The variation of construction of the two embodiments is that the FIG. 3 embodiment comprises straight segments and the FIG. 4 embodiment comprises curved segments. In each embodiment the left hand vanes 39 and right hand vanes 40 all have their points a maximum displacement 42 projecting inward toward the mid point of the scroll sheet 35 or 36. The maximum height of the vane 37 is at the center segment 42. In the preferred embodiment the height or distance from the face of the scroll sheet 35 or 36 was one (1) inch. The degree or dimensions of height and deflection may vary; however, the dimensions utilized in the preferred embodiment have proved satisfactory. Each embodiment FIG. 3 or FIG. 4 should preferably comprise substantial and equal number of left hand 39 and right hand 40 vanes 37. In operation, the roll of seed cotton in the roll box 34 tends to be compressed as it rotates from 41 toward 42 and to be loosened as it rotates to 43. The left scroll sheet vanes 39 and the right scroll sheet vanes 40 are uniformly positioned on approximately six 6-inch centers at intervals as they approach the center of the elongated scroll sheets 35 and 36.

For the overall functions of these vanes 37 in the ginning process, reference is again made to FIG. 2. As the gin saws 14 rotate the seed cotton roll is driven in rotation in the roll box 24 in a direction opposite to the rotation of the gin saws. This rotation of the cotton seed roll against the front scroll sheet 35 and the rear scroll sheet 36, with the integral constructed vanes 37 projecting into the rotating cotton seed roll, result in a working, loosening, and lateral movement of the seed cotton roll moving it laterally across the saw teeth 17. The saw teeth 17 pull the lint through the space in the ginning ribs 18 where the lint may be caused to strike a lint roller 44 which, in conjunction with the action of the ginning saws 14 and the roller 44, further clean the lint cotton by causing trash and small chips to move into the mote chamber 45. The cleaning process is improved by the action of the reciprocating lint cleaning bar 46. The chips and fine trash are removed through chip channel 47.

As previously stated, this improved roll box 24 may be utilized in either a brush gin or an air jet gin. In a preferred embodiment and for this description, the lint cotton is illustrated as removed from the teeth 17 of the ginning saws 14 by means of lint brush 50 which are mounted on a shaft 51 and driven by a suitable rotating means not shown at rate of speed in excess of rate of rotation of the ginning saws. Although not specifically illustrated in the views, all the rotating components are mounted in suitable bearing means which are secured to the frame 12 of the gin stand and the various shafts are driven by power means at relative rates of rotation well known in the ginning art. Lint is discharged from the gin stand 11 through lint channel 53 into conduit not shown which leads to an appropriate collector. As previously stated, the device of this invention would effectively operate in a gin utilizing a discharge of high pressure air through delinting nozzles not shown. As previously stated, the gravements of this invention pertains to the construction of a gin stand incorporating an improved seed cotton roll box 24 utilizing the vanes 37 as heretofore described in detail.

Figure 4:
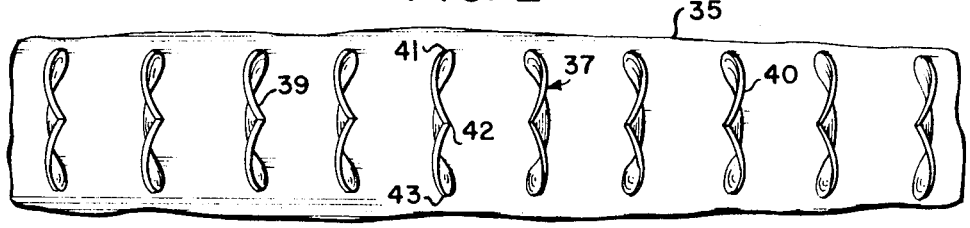
FIG. 4 is a front elevation view of the scroll sheet illustrating an arcuate or curved method of incorporating the invention in the vanes of the scroll sheet.

Your inventor has described in detail the construction of this invention and illustrated the preferred method of construction of the vanes 37 as incorporated in roll box 24 and he has also illustrated a secondary method of construction of the vanes 37 in FIG. 4 and their utilization in a cotton gin stand construction. What is desired to be claimed is all embodiments or equivalents of this invention as utilized in seed cotton roll box in a gin stand not departing from concept and its embodiment or the equivalents of this invention as defined in the appended claims.

I claim:
1. A cotton gin stand comprising:
   (a) a frame structure,
   (b) a multiplicity of parallel ginning saws having flat planar sides mounted for rotation on said frame structure,
   (c) ginning ribs defining a series of parallel planes securely mounted on said frame structure adjacent and parallel to the plane defined by the sides of said ginning saws,
   (d) seed cotton feed means constructed and arranged to supply seed cotton to said ginning saws,
   (e) delinting means constructed and arranged to remove lint from said ginning saws,
   (f) said seed cotton feed means comprising a substantially closed seed cotton roll box having an interior and an exterior portion,
   (g) said roll box comprising an arcuate scroll sheet substantially perpendicular to the planes defined by the sides of said ginning saws, and
   (h) said scroll sheet further comprising:
      (1) a left hand portion, a right hand portion, and a center portion,
      (2) said scroll sheet further comprising multiple vanes defining a substantially horizontal elongated V shaped structure, said multiple vanes being so constructed and arranged wherein the apex of the V shaped vanes in the left hand portion and the right hand portion of said scroll sheet project toward the center portion.

2. The invention of claim 1 wherein said vanes project diagonally progressively from a first point in a plane to a center point of maximum deflection out of said plane the said vanes thereafter regressively returning to a second point in the same plane but spaced from the said first point.

3. The invention of claim 1 wherein the vanes comprise two substantially straight segments defining an angle comprising an elongated V shaped structure.

4. The invention of claim 1 wherein the vanes comprise two curved segments intersecting at a point substantially comprising an elonagted V shaped structure.

References Cited
UNITED STATES PATENTS

| | | | |
|---|---|---|---|
| 175,481 | 3/1876 | Massey | 19—55 R |
| 323,548 | 8/1885 | Washburne | 19—55 R |
| 823,439 | 6/1906 | Reynolds | 19—55 R |

DORSEY NEWTON, Primary Examiner